(12) United States Patent
Huang et al.

(10) Patent No.: US 9,055,637 B2
(45) Date of Patent: Jun. 9, 2015

(54) LIGHT EMITTING DIODE LOAD DRIVING APPARATUS

(71) Applicant: Beyond Innovation Technology Co., Ltd., Taipei (TW)

(72) Inventors: Nan-Chuan Huang, Taipei (TW); Fu-Kuo Yang, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 66 days.

(21) Appl. No.: 14/054,836

(22) Filed: Oct. 16, 2013

(65) Prior Publication Data

US 2014/0191671 A1 Jul. 10, 2014

(30) Foreign Application Priority Data

Jan. 10, 2013 (TW) .............................. 102100943 A

(51) Int. Cl.
H05B 33/08 (2006.01)
(52) U.S. Cl.
CPC ........... *H05B 33/0815* (2013.01); *Y02B 20/346* (2013.01)
(58) Field of Classification Search
CPC .................................................. H05B 33/0815
USPC ................... 315/186, 224, 297, 307
See application file for complete search history.

(56) References Cited

U.S. PATENT DOCUMENTS

| 2009/0079355 A1* | 3/2009 | Zhou et al. ..................... 315/246 |
| 2012/0043893 A1 | 2/2012 | Sadwick et al. |
| 2012/0043900 A1* | 2/2012 | Chitta et al. ................... 315/201 |

FOREIGN PATENT DOCUMENTS

| TW | 201012298 | 3/2010 |
| TW | 201220931 | 5/2012 |
| TW | 201238397 | 9/2012 |

* cited by examiner

*Primary Examiner* — Daniel D Chang
(74) *Attorney, Agent, or Firm* — Winston Hsu; Scott Margo

(57) ABSTRACT

An LED load driving apparatus including a power conversion circuit and a control chip is provided. The power conversion circuit receives an input voltage and drives an LED load in response to a PWM signal. The control chip includes a control core circuit and a memory unit. The control core circuit is operated under a system voltage to provide the PWM signal for controlling operation of the power conversion circuit. The control core circuit is inactivated during a power-off period and restarted during a power-on period. The memory unit is operated under the input voltage and is configured to: store a dimming operation data before the control core circuit is inactivated during the power-off period; and provide the stored dimming operation data during the power-on period to the control core circuit, so as to make the control core circuit perform corresponding dimming operation relating to the LED load.

9 Claims, 2 Drawing Sheets

LIGHT EMITTING DIODE LOAD DRIVING APPARATUS

CROSS-REFERENCE TO RELATED APPLICATION

This application claims the priority benefit of Taiwan application serial no. 102100943, filed on Jan. 10, 2013. The entirety of the above-mentioned patent application is hereby incorporated by reference herein and made a part of this specification.

BACKGROUND OF THE INVENTION

1. Field of the Invention

The invention relates to a light emitting diode load driving apparatus, and more particularly, to a light emitting diode load driving apparatus for reducing power loss during a power-off period and storing segmental dimming data.

2. Description of Related Art

The traditional light emitting diode (LED) load driving apparatus is generally composed of a control chip, a power switch, and circuits such as a plug-in circuit. In particular, the control chip can provide a driving signal to switch the power switch such that an LED can emit light based on a current generated by switching the power switch. With the current LED dimming technology, the conventional LED load driving apparatus uses pulse width modulation (PWM) dimming technology to achieve high contrast, wherein the dimming principle works by adjusting the length of the duty cycle of the PWM dimming signal and controlling the time ratio of the full-lit and full-dark LED to achieve the purpose of dimming.

Generally, in the application of LED lighting multi-segmental dimming, a voltage is provided to activate the LED driving apparatus such that the control chip is operated under the voltage. When the LED dimming is powered-off, the control chip needs the power provided by an external capacitor of the control chip to last through the power-off period of the LED. However, if the power of the capacitor is not enough for the control chip to last through the power-off period of the LED, the control chip will become inactivated and therefore the temporarily stored adjustment PWM dimming operation data (such as the brightness sequence of the LED) of the control chip will be lost. As a result, the LED driving apparatus cannot implement multi-segmental dimming operations. Traditionally, the external capacitor is generally increased to solve the problem, however the method not only increases manufacturing costs but also increases the area needed for the printed circuit board (PCB).

SUMMARY OF THE INVENTION

The invention provides a light emitting diode (LED) load driving apparatus. The LED load driving apparatus can inactivate/activate a control core circuit in a control chip during a power-off period/power-on period and read/access a dimming operation data from a memory unit in the control chip so as to make the control core circuit perform a corresponding dimming operation of an LED load.

The invention provides an LED load driving apparatus. The LED load driving apparatus includes a power conversion circuit and a control chip. The power conversion circuit is used for receiving an input voltage and driving an LED load in response to a pulse width modulation signal. The control chip is coupled to the power conversion circuit, wherein the control chip includes a control core circuit and a memory unit. The control core circuit is operated under a system voltage to provide the pulse width modulation signal for controlling operation of the power conversion circuit, wherein the control core circuit is inactivated during a power-off period and restarted during a power-on period. The memory unit is coupled to the control core circuit and operated under the input voltage. The memory unit is configured to: store a dimming operation data provided by the control core circuit and before the control core circuit is inactivated during the power-off period; and provide the stored dimming operation data during the power-on period to the control core circuit, so as to make the control core circuit perform a corresponding dimming operation relating to the LED load.

In an embodiment of the invention, the power conversion circuit includes a power switch, a filter circuit, and an electricity feedback circuit. The power switch has a first terminal, a second terminal, and a control terminal, wherein the first terminal of the power switch receives the input voltage, the second terminal of the power switch is coupled to a ground potential through a Schottky diode, and the control terminal of the power switch is coupled to an output pin of the control chip to receive the pulse width modulation signal. The filter circuit is coupled between a ground pin of the control chip and the LED load, and configured to generate a constant current to drive the LED load in response to a switching of the power switch. The electricity feedback circuit is coupled to a power pin of the control chip and the anode of the LED load, and configured to provide an operating voltage required by the control chip in operation during driving the LED load.

In an embodiment of the invention, the power conversion circuit further includes a frequency setting circuit having a resistor, wherein the first terminal of the resistor of the frequency setting circuit is coupled to the output pin, the second terminal of the resistor of the frequency setting circuit is coupled to the second terminal of the power switch, and the control chip sets the frequency of the pulse width modulation signal in response to the resistance of the resistor of the frequency setting circuit.

In an embodiment of the invention, the power conversion circuit further includes a current sensing circuit having a resistor, wherein the first terminal of the resistor of the current sensing circuit is coupled to a ground pin of the control chip and the second terminal of the resistor of the current sensing circuit is coupled to the second terminal of the power switch.

In an embodiment of the invention, the power conversion circuit further includes a compensation circuit coupled between a compensation pin and the ground pin of the control chip, and configured to compensate a phase margin of the LED load driving apparatus.

In an embodiment of the invention, the power conversion circuit further includes a voltage divider circuit coupled to a detection pin and the ground pin of the control chip, and coupled to a DC voltage generation circuit configured to provide the input voltage. The voltage divider circuit is configured to obtain a detecting voltage in response to a dividing voltage on a voltage detection terminal, and obtain an ON/OFF state of a switch element within the DC voltage generation circuit by comparing the detecting voltage with a reference detecting voltage. The control chip is configured to detect and obtain the ON/OFF state of the switch element within the DC voltage generation circuit, so as to adjust a duty cycle of the pulse width modulation signal.

In an embodiment of the invention, the filter circuit includes an inductor and a capacitor. The first terminal of the inductor is coupled to the ground pin and the second terminal of the inductor is coupled to the anode of the LED load. The first terminal of the capacitor is coupled to the second terminal of the inductor and the anode of the LED load, and the second terminal of the capacitor is coupled to the ground potential.

In an embodiment of the invention, the control chip further includes a voltage regulator unit used for converting the input voltage to the system voltage.

In an embodiment of the invention, the LED load at least includes an LED or an LED string.

Based on the above, the invention can inactivate/activate the control core circuit in the control chip when the control chip is in a power-off period/power-on period and read/access the dimming operation data from the memory unit in the control chip so as to make the control core circuit perform a corresponding dimming operation of the LED load. Moreover, since the operation of the control core circuit in the control chip can be inactivated during the power-off period, power consumption can be reduced during the power-off period. Furthermore, the external capacitor does not need to be increased, thereby achieving the efficacies of reduction of manufacturing costs and not needing to increase the area needed for the printed circuit board (PCB).

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
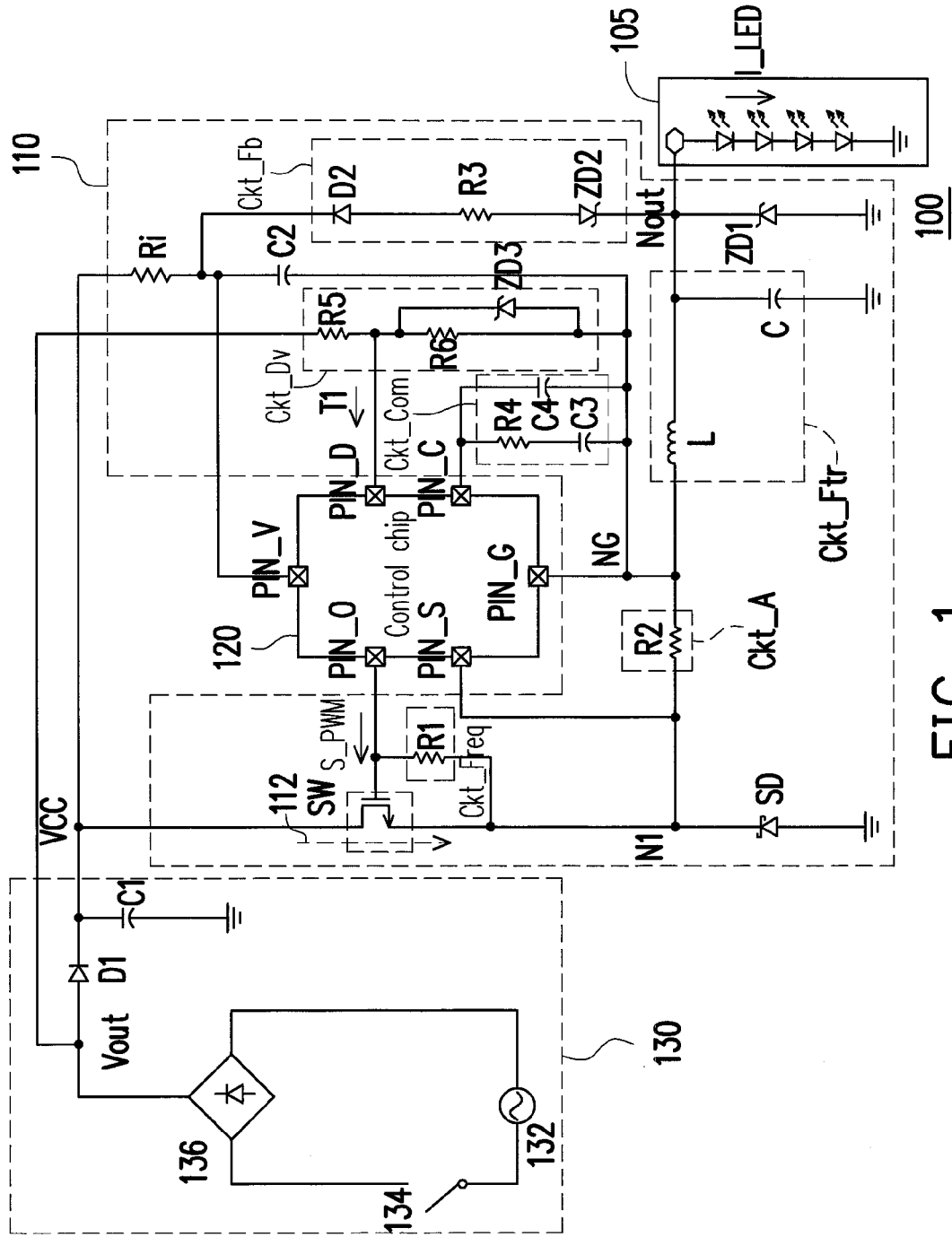
FIG. 1 is a schematic diagram of a light emitting diode load driving apparatus according to an embodiment of the invention.

Reference will now be made in detail to the present preferred embodiments of the invention, examples of which are illustrated in the accompanying drawings.

Wherever possible, the same reference numbers are used in the drawings and the description to refer to the same or like parts.

FIG. 1 is a schematic diagram of a light emitting diode load driving apparatus according to an embodiment of the invention. In the present embodiment, an LED load driving apparatus 100 is used for driving an LED load 105. Referring to FIG. 1, the LED load driving apparatus 100 includes a power conversion circuit 110 and a control chip 120. The power conversion circuit 110 is coupled to the LED load 105. The control chip 120 is coupled to the power conversion circuit 110 for controlling the operation of the power conversion circuit 110. In particular, the LED load 105 at least includes an LED or an LED string (that is, a plurality of LEDs connected in series in a forward direction).

In terms of the structure/configuration of the power conversion circuit 110, the power conversion circuit 110 includes a power switch SW, a Schottky diode SD, a frequency setting circuit Ckt_Freq, a current sensing circuit Ckt_A, a filter circuit Ckt_Ftr, an electricity feedback circuit Ckt_Fb, a compensation circuit Ckt_Com, a voltage divider circuit Ckt_Dv, a resistor Ri, a capacitor C2, and a Zener diode ZD1. In particular, the filter circuit Ckt_Ftr is implemented by the structure of an inductor L and a capacitor C. The Zener diode ZD1 is for assuring the voltage stability of an output node Nout. In the present embodiment, the power conversion circuit 110 is a buck power conversion circuit.

More specifically, the power switch SW is switched on or off in response to the driving signal (i.e. the PWM signal S_PWM) provided by the control chip 120 such that the power conversion circuit 110 can drive the LED load 105 based on the switching of the power switch SW and the conversion related to the input voltage VCC. In particular, the Schottky diode SD is used for forming a loop when the power switch SW is off and the inductor L and the capacitor C can be used for providing a filter function to generate a constant current to drive the LED load 105.

Specifically, the power switch SW has a first terminal, a second terminal, and a control terminal, wherein the first terminal of the power switch SW is coupled to a DC voltage generation circuit 130 to receive the input voltage VCC, the second terminal of the power switch SW is coupled to a ground potential GND through a node N1 and the Schottky diode SD, and the control terminal of the power switch SW is coupled to an output pin PIN_O of the control chip 120 to receive a pulse width modulation (PWM) signal S_PWM outputted by the control chip 120.

When the power switch SW is turned on in response to the PWM signal S_PWM provided by the control chip 120, the power conversion circuit 110 provides the node N1 with a stable bias, and therefore the inductor L can store energy in response to the voltage of the node N1, and accordingly generate a driving current I_LED. When the power switch SW is turned off in response to the PWM signal S_PWM provided by the control chip 120, the inductor L releases electric energy to continuously generate the driving current I_LED to drive the LED load 105.

The filter circuit Ckt_Ftr is coupled between a node NG (equivalent to the ground pin PIN_G of the control chip 120) and the LED load 105 to generate the constant current in response to the switching of the power switch SW to drive the LED load 105. More specifically, the first terminal of the inductor L of the filter circuit Ckt_Ftr is coupled to the node NG, the second terminal of the inductor L of the filter circuit Ckt_Ftr is coupled to the output node Nout (equivalent to the anode of the LED load 105), and the first terminal of the capacitor C of the filter circuit Ckt_Ftr is coupled to the second terminal of the inductor L and the output node Nout, and the second terminal of the capacitor C of the filter circuit Ckt_Ftr is coupled to the ground potential GND.

In the present embodiment, the configuration of each of the Schottky diode SD, the inductor L, and the capacitor C is a design option. In other words, in other embodiments, those skilled in the art can implement the function of the Schottky diode SD through other voltage regulator devices or voltage regulator circuits, and can also implement the function of the inductor L and the capacitor C in the power conversion circuit 110 through the configuration of other filter devices. The invention is not limited to the configuration illustrated in FIG. 1.

Moreover, the ground pin PIN_G of the control chip 120 is coupled to the node NG and the voltage level of the node NG is used as the reference voltage level for each circuit unit in the control chip 120. More specifically, the voltage level of the node NG is established in response to the voltage level of the node N1 and the voltage drop caused by the resistor R2 of the current sensing circuit Ckt_A. During the turn-on period of the power switch SW, the power conversion circuit 110 generates a current flowing through the power switch SW, the node N1, the resistor R2, and the inductor L, i.e. a current with a current direction from the node N1 to the node NG. Therefore, regardless of the magnitude of the voltage level of the node N1 or the magnitude of the current flowing through the resistor R2, the voltage level of the node NG is always less than the voltage level of the node N1 in response to the voltage drop of the resistor R2.

In this way, the voltage level of the node NG should be less than the voltage level of any node in the power conversion circuit 110, such that a pin corresponding to the other circuit units in the control chip 120 does not have a voltage level lower than the voltage level of the ground pin PIN_G regardless of which node of the power conversion circuit 110 the pin is coupled to.

More specifically, since the ground pin PIN_G of the control chip 120 is indirectly connected to a power switch path 112 and is in a floating state, the ground pin PIN_G has the lowest voltage level in the control chip 120. Therefore, the control chip 120 does not have the problem of reverse conduction between the pins. In particular, the indirect connection refers to that the ground pin PIN_G is coupled to the power switch path 112 through at least one circuit device capable of producing the voltage drop. Moreover, the situation that the ground pin PIN_G is in the floating state represents that the voltage level of the ground pin PIN_G changes with the magnitude of the current flowing through the resistor R2, so as to maintain the lowest voltage level in the control chip 120.

It should be noted that the resistor R2 configured between the node N1 and the node NG of the present embodiment is only an example, and any circuit device and structure capable of producing the voltage drop and floating the ground pin PIN_G can be used to replace the resistor R2, which is not limited by the invention.

In the present embodiment, the DC voltage generation circuit 130 can be implemented through the structure of an AC power 132, a switch element 134, and a bridge rectifier 136. However, the invention is not limited thereto. Moreover, the DC voltage generation circuit 130 further includes a diode D1 and a capacitor C1. The anode of the diode D1 is coupled to the bridge rectifier 136 and the cathode of the diode D1 is coupled to a power pin PIN_V of the control chip 120 through the resistor Ri. The capacitor C1 is coupled between the cathode of the diode D1 and the ground potential GND. In particular, the DC voltage generation circuit 130 can provide the stable input voltage VCC through the charge/discharge of the capacitor C1.

In the structure of the DC voltage generation circuit 130, the control chip 120 can be coupled to the anode of the diode D1 through the detection pin PIN_D and the voltage divider circuit Ckt_Dv of the power conversion circuit 110, such that the control chip 120 can obtain the turn-on/off (ON/OFF) state of the switch element 134 in the DC voltage generation circuit 130 in response to the voltage of the anode (that is, detection voltage terminal Vout) of the diode D1. Therefore, the control chip 120 can adjust the duty cycle of the outputted PWM signal S_PWM based on the turn-on/off state of the switch element 134, so as to change the light-emitting intensity of the LED load 105 to implement the segmental dimming function. Here, the voltage divider circuit Ckt_Dv can divide the voltage of the anode of the diode D1 by using the resistors R5 and R6 and the Zener diode ZD3, and to regulate the voltage by using the Zener diode ZD3. However, the structure of the voltage divider circuit Ckt_Dv is not limited to the implementation illustrated in FIG. 1.

More specifically, the detection pin PIN_D of the control chip 120 is coupled to the voltage divider circuit Ckt_Dv of the power conversion circuit 110 such that the control chip 120 obtains a corresponding detection voltage Ti through the voltage divider circuit Ckt_Dv in response to the dividing voltage of the detection voltage terminal Vout, and obtains the turn-on/off state of the switch element 134 in the DC voltage generation circuit 130 by comparing the detection voltage T1 with a reference detection voltage. Therefore, the control chip 120 can adjust the ON/OFF ratio of the duty cycle of the PWM operation based on the turn-on/off state of the switch element 134 in the DC voltage generation circuit 130, such as the number of turn-ons of the switch element 134, so as to change the brightness needed for the LED load 105. In particular, the brightness of the LED load 105 can correspond to the magnitude of the current I_LED needed to flow through the LED load 105.

For instance, when the number of turn-ons of the switch element 134 is one, the ON/OFF ratio of the duty cycle of the corresponding PWM operation is 75% ON and 25% OFF, and when the number of turn-ons of the switch element 134 is two, the ON/OFF ratio of the duty cycle of the corresponding PWM operation is 50% ON and 50% OFF. However, the embodiments of adjusting the duty cycle ratios operated by the PWM are only design options and are not limited thereto.

Therefore, the control chip 120 responds to the dividing voltage of the detection voltage terminal Vout through the detection pin PIN_D and the voltage divider circuit Ckt Dv to obtain the turn-on/off state of the switch element 134 in the DC voltage generation circuit 130 and thereby obtains the ON/OFF ratio of the duty cycle of the PWM signal. As a result, the ON/OFF ratio of the duty cycle of the PWM signal can be used as the dimming operation data needed for the segmental dimming operation of the LED load driving apparatus 100. With the number of turn-ons of the switch element 134 detected by the detection pin PIN_D of the control chip 120, different brightness sequences of the LED load 105 can also be rendered. Moreover, the dimming operation data are all temporarily stored in the control chip 120, such as in a memory unit in the control chip 120 such that the dimming operation data can be used as a reference data for the control chip 120 when outputting the ON/OFF ratio of the duty cycle of the PWM signal.

The electricity feedback circuit Ckt_Fb is further included in the power conversion circuit 110, wherein the electricity feedback circuit Ckt Fb is coupled between the power pin PIN_V of the control chip 120 and the output node Nout, the electricity feedback circuit Ckt Fb can provide the needed operating voltage to the control chip 120 during the period of driving the LED load 105 so as to replace the input voltage VCC originally providing power to the control chip 120. Here, the electricity feedback circuit Ckt_Fb can be implemented by a feedback path formed by connecting a Zener diode ZD2, a resistor R3, and a diode D2 in series, though the invention is not limited thereto.

The current sensing circuit Ckt_A is further included in the power conversion circuit 110, wherein the current sensing circuit Ckt_A is coupled to a sensing pin PIN_S of the control chip 120, and the control chip 120 can sense the current flowing through the current sensing circuit Ckt_A through the sensing pen PIN_S such that the duty cycle of the PWM signal S_PWM outputted by the output pin PIN_O of the control chip 120 can be adjusted. In other words, the control chip 120 responds to the current flowing through the current sensing circuit Ckt_A, that is, the magnitude of the current I_LED of the LED load 105, to adjust the duty cycle of the PWM signal S_PWM. In this embodiment, in the case that the resistance of the LED load 105 does not change, the current I_LED flowing through the LED load 105 changes with the voltage of the node Nout.

More specifically, the current sensing circuit Ckt_A can be implemented by the structure of a resistor. Here, the current sensing circuit Ckt_A is exemplified as including a resistor R2. Specifically, the first terminal of the resistor R2 is coupled to the sensing pin PIN_S and the second terminal of the resistor R2 is coupled to the ground pin PIN_G. During the period that the LED load driving apparatus 100 drives the LED load 105, the current direction of the current flowing through the resistor R2 is from the node N1 to the node NG. Therefore, based on the resistance of the resistor R1 and the voltage drop caused by the current flowing through the resistor R2, the voltage level of the sensing pin PIN_S is still greater than the voltage level of the ground pin PIN_G.

It should be noted that, the current sensing circuit Ckt_A of the invention is not limited to be implemented by the structure of a resistor. Although the resistor R2 is exemplarily configured between the nodes N1 and NG in the present embodiment, any circuit device and structure capable of producing the voltage drop and floating the ground pin PIN_G can be used to replace the resistor R2, which is not limited by the invention.

Moreover, the output pin PIN_O of the control chip 120 is coupled to the frequency setting circuit Ckt_Freq to set the frequency of the PWM signal S_PWM in response to the electrical characteristics of the frequency setting circuit Ckt_Freq. In the present embodiment, the frequency setting circuit Ckt_Freq can be implemented by the structure of a resistor. Here, the frequency setting circuit Ckt_Freq is exemplified by a resistor R1, wherein the first terminal of the resistor R1 is coupled to the output pin PIN_O, the second terminal of the resistor R1 is coupled to the node N1, and a designer can correspondingly set the frequency of the PWM signal S_PWM by adjusting the resistance of the resistor R1. However, the frequency setting circuit Ckt_Freq of the invention is not limited to be implemented by the structure of a resistor.

The control chip 120 is coupled to the compensation circuit Ckt_Com through a compensation pin PIN_C, wherein the control chip 120 provides a compensation voltage to adjust the duty cycle of the PWM signal S_PWM. Moreover, the control chip 120 can also compensate the phase margin of the LED load driving apparatus 100 through the compensation circuit Ckt_Com to improve operation stability and avoid oscillation generated during operation of the LED load driving apparatus 100 that influences the light emitting characteristics of the LED load 105. In particular, the compensation circuit Ckt_Com can be implemented by the structure of capacitors C3 and C4 and a resistor R4 as shown in FIG. 1, though the invention is not limited thereto.

It should be noted that the circuit configuration of each of the power conversion circuit 110, the control chip 120, and the DC voltage generation circuit 130 is only a preferred exemplary implementation of the invention. In actuality, as long as the voltage level of the ground pin PIN_G is the lowest in the control chip 120 through the voltage drop of a circuit device (such as the resistor R2), it is considered to be within the scope of the invention.

Figure 2:
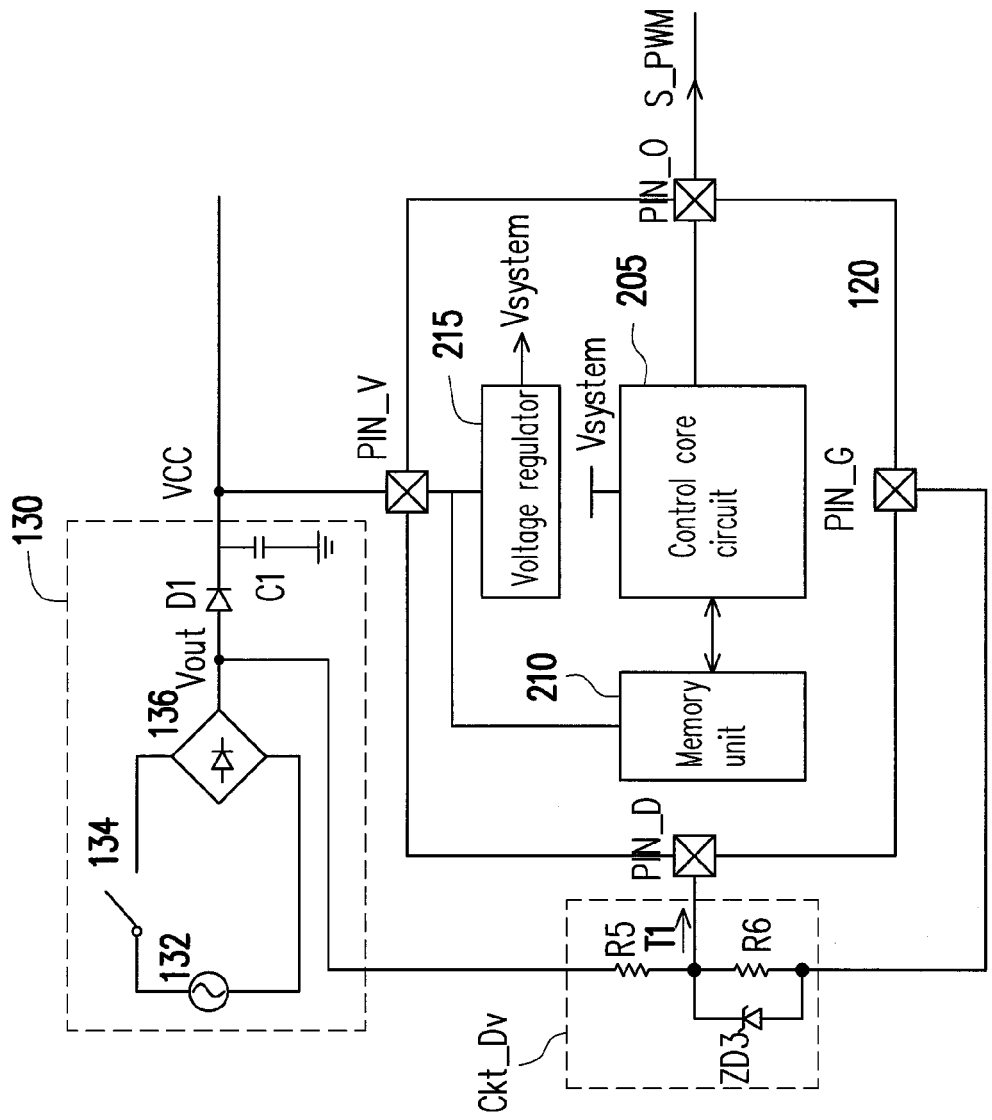
FIG. 2 is a schematic block diagram of the interior of a control chip according to an embodiment of the invention.

However, to further explain the implementation of the interior of the control chip of the invention, please refer to FIG. 2. FIG. 2 is a schematic block diagram of the interior of a control chip according to an embodiment of the invention.

In the present embodiment, the control chip 120 receives the input voltage VCC from the DC voltage generation circuit 130 through the power pin PIN_V such that the control chip operates under the input voltage VCC. The control chip 120 includes a control core circuit 205, a memory unit 210, and a voltage regulator 215. In particular, the voltage regulator 215 receives the input voltage VCC from the power pin PIN_V and converts (such as boost/buck) the input voltage VCC to a system voltage Vsystem to provide the control core circuit 205 with the needed operating voltage for operation. It should be noted that the control core circuit 205 and the memory unit 210 respectively operate under different operating voltages, wherein the control core circuit 205 operates under the system voltage Vsystem converted by the voltage regulator 215 and the memory unit 210 operates under the input voltage VCC.

Specifically, when the LED load driving apparatus 100 is in the power-off period, the control core circuit 205 first stores the dimming operation data (that is, the different ON/OFF ratios of the duty cycle of the PWM signal of FIG. 1) in the memory unit 210 and enter into an inactivated state after storing the dimming operation data in the memory unit 210, wherein the voltage regulator 215 also enters into the inactivated state at the same time. When the LED load driving apparatus 100 is in the power-on period, the control core circuit 205 and the voltage regulator 215 are reactivated, and the control core circuit 205 reads/accesses the dimming operation data stored in the memory unit 210 such that the control core circuit 205 can continue to perform the dimming operation of the LED load 105. In the present embodiment, the power-off period is the situation in which the switch element 134 in the DC voltage generation circuit 130 is switched off and no input voltage VCC is provided. On the other hand, the power-on period is the situation in which the switch element 134 in the DC voltage generation circuit 130 is switched on and the input voltage VCC is again provided.

The memory unit 210 can be a latch formed by a plurality of logic gates having the function of data storage connected in series for latching the dimming operation data. In the present embodiment, one of the implementations of the logic gates is an RS flip-flop; however, any type of flip-flop can be used for implementation based on the present embodiment. For instance, when the dimming operation data is a 2-bit number, wherein the dimming operation data corresponds to the four states of "00", "01", "10", and "11", and the interior of the memory unit 210 thereof has two latches for storage operations, wherein the four states of the dimming operation data can respectively correspond to different duty cycle ratios of the PWM signal, such as when the stored dimming operation data is "01", then the corresponding duty cycle ratio of the PWM signal thereof is 70% ON and 30% OFF by corresponding to the default Truth Table in the control chip 120 thereof, and when the stored dimming operation data is "10", then the corresponding duty cycle ratio of the PWM signal thereof is 50% ON and 50% OFF by corresponding to the default Truth Table in the control chip 120 thereof.

Therefore, when resuming the power-on period from the power-off period, the control core circuit 205 can obtain the duty cycle ratio (that is, 50% ON, 50% OFF) of the present PWM signal by cumulatively adding 1 (that is, "10") according to the 2-bit dimming operation data (such as "01") stored by the memory unit 210 and thereby continue the dimming operation of the LED load 105 performed by the control chip 120 before the power-off period. However, the structure of the logic circuit in the memory unit 210 is only a design option and can be adjusted based on the number of bits (that is, the different states of brightness of segmental dimming) of the dimming operation data, but is not limited thereto.

It should be noted that the memory unit 210 operates under the input voltage VCC during the power-off period and not under the system voltage Vsystem. Therefore, the memory unit 210 can continuously store the dimming operation data from the control core circuit 205 during the power-off period such that the control core circuit 205 can continue the dimming operation of the LED load 105 performed by the control chip 120 before the power-off period by reading the dimming operation data stored by the memory unit 210 in the next power-on period. Moreover, since both the control core circuit 205 and the voltage regulator 215 are inactivated during the power-off period such that the overall power consumption of the control chip 120 is very low during the period, the capacitor C1 in the DC voltage generation circuit 130 does not need to be made too large, thereby reducing costs.

In other words, the invention can inactivate/activate the control core circuit in the control chip when the control chip is in a power-off period/power-on period and read/access the dimming operation data from the memory unit in the control chip so as to make the control core circuit perform a corresponding dimming operation relating to the LED load. Moreover, since the operation of the control core circuit in the control chip can be inactivated during the power-off period, power consumption can be reduced during the power-off period. Furthermore, the external capacitor does not need to be increased, thereby achieving the efficacies of reduction of manufacturing costs and not needing to increase the area needed for the printed circuit board (PCB).

Although the invention has been described with reference to the above embodiments, it will be apparent to one of the ordinary skill in the art that modifications and variations to the described embodiments may be made without departing from the spirit and scope of the invention. Accordingly, the scope of the invention will be defined by the attached claims not by the above detailed descriptions.

What is claimed is:

1. A light emitting diode (LED) load driving apparatus, comprising:
   a power conversion circuit configured to receive an input voltage and drive an LED load in response to a pulse width modulation signal;
   a control chip coupled to the power conversion circuit, wherein the control chip comprises:
      a control core circuit operated under a system voltage to provide the pulse width modulation signal for controlling an operation of the power conversion circuit, wherein the control core circuit is inactivated during a power-off period and restarted during a power-on period; and
      a memory unit coupled to the control core circuit and operated under the input voltage, wherein the memory unit is configured to:
         store a dimming operation data provided by the control core circuit and before the control core circuit is inactivated during the power-off period; and
         provide the stored dimming operation data during the power-on period to the control core circuit so as to make the control core circuit perform a corresponding dimming operation relating to the LED load.

2. The LED load driving apparatus of claim 1, wherein the power conversion circuit comprises:
   a power switch having a first terminal, a second terminal, and a control terminal, wherein the first terminal of the power switch receives the input voltage, the second terminal of the power switch is coupled to a ground potential through a Schottky diode, and the control terminal of the power switch is coupled to an output pin of the control chip to receive the pulse width modulation signal;
   a filter circuit coupled between a ground pin of the control chip and the LED load, and configured to generate a constant current to drive the LED load in response to a switching of the power switch; and
   an electricity feedback circuit coupled to a power pin of the control chip and an anode of the LED load, and configured to provide an operating voltage required by the control chip in operation during driving the LED load.

3. The LED load driving apparatus of claim 2, wherein the power conversion circuit further comprises:
   a frequency setting circuit having a resistor, a first terminal of the resistor is coupled to the output pin, a second terminal of the resistor is coupled to the second terminal of the power switch, and the control chip sets a frequency of the pulse width modulation signal in response to a resistance of the resistor.

4. The LED load driving apparatus of claim 2, wherein the power conversion circuit further comprises:
   a current sensing circuit having a resistor, a first terminal of the resistor is coupled to the ground pin of the control chip and a second terminal of the resistor is coupled to the second terminal of the power switch.

5. The LED load driving apparatus of claim 2, wherein the power conversion circuit further comprises:
   a compensation circuit coupled between a compensation pin and the ground pin, and configured to compensate a phase margin of the LED load driving apparatus.

6. The LED load driving apparatus of claim 2, wherein the power conversion circuit further comprises:
   a voltage divider circuit coupled to a detection pin and the ground pin of the control chip, and coupled to a DC voltage generation circuit configured to provide the input voltage,
   wherein the voltage divider circuit is configured to obtain a detecting voltage in response to a dividing voltage on a voltage detection terminal, and obtain an ON/OFF state of a switch element within the DC voltage generation circuit by comparing the detecting voltage with a reference detecting voltage,
   wherein the control chip is configured to detect and obtain the ON/OFF state of the switch element within the DC voltage generation circuit, so as to adjust a duty cycle of the pulse width modulation signal.

7. The LED load driving apparatus of claim 2, wherein the filter circuit comprises:
   an inductor, wherein a first terminal thereof is coupled to the ground pin and a second terminal thereof is coupled to the anode of the LED load; and
   a capacitor, wherein a first terminal thereof is coupled to the second terminal of the inductor and the anode of the LED load, and a second terminal thereof is coupled to the ground potential.

8. The LED load driving apparatus of claim 1, wherein the control chip further comprises a voltage regulator configured to convert the input voltage to the system voltage.

9. The LED load driving apparatus of claim 1, wherein the LED load at least comprises an LED or an LED string.

* * * * *